(12) United States Patent
Samson et al.

(10) Patent No.: US 7,774,624 B2
(45) Date of Patent: Aug. 10, 2010

(54) SYSTEM FOR PREVENTING TAMPERING WITH A SIGNAL CONDITIONER REMOTE FROM A HOST SYSTEM

(75) Inventors: Allan L Samson, Fort Lupton, CO (US); Michael Keilty, Lyons, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 12/339,385

(22) Filed: Dec. 19, 2008

(65) Prior Publication Data

US 2009/0105968 A1  Apr. 23, 2009

Related U.S. Application Data

(63) Continuation of application No. 09/489,864, filed on Jan. 24, 2000, now abandoned.

(51) Int. Cl.
  *G06F 11/30* (2006.01)
  *G06F 12/14* (2006.01)
  *G01F 1/00* (2006.01)
  *G06F 12/16* (2006.01)

(52) U.S. Cl. .............................. 713/194; 702/1; 702/45

(58) Field of Classification Search ................. 713/194; 702/1, 45
See application file for complete search history.

(56) References Cited

U.S. PATENT DOCUMENTS

| 4,187,721 A | | 2/1980 | Smith | |
|---|---|---|---|---|
| 4,388,690 A | * | 6/1983 | Lumsden | 702/61 |
| 4,549,168 A | * | 10/1985 | Sieradzki | 340/525 |
| 4,893,248 A | * | 1/1990 | Pitts et al. | 705/400 |
| 4,934,196 A | | 6/1990 | Romano | |
| 4,996,871 A | | 3/1991 | Romano | |
| 5,491,791 A | * | 2/1996 | Glowny et al. | 714/37 |
| 5,594,180 A | * | 1/1997 | Carpenter et al. | 73/861.356 |
| 5,617,084 A | * | 4/1997 | Sears | 340/870.02 |
| 5,629,856 A | * | 5/1997 | Ricard | 705/417 |
| 5,805,711 A | * | 9/1998 | Windel et al. | 380/55 |
| 5,832,503 A | * | 11/1998 | Malik et al. | 709/223 |
| 5,926,463 A | * | 7/1999 | Ahearn et al. | 370/254 |
| 6,026,293 A | * | 2/2000 | Osborn | 455/411 |

FOREIGN PATENT DOCUMENTS

| JP | S54-52570 | 4/1979 |
|---|---|---|
| JP | 4334196 | 11/1992 |

* cited by examiner

*Primary Examiner*—Michael J Simitoski
(74) *Attorney, Agent, or Firm*—The Ollila Law Group LLC

(57) ABSTRACT

A system for detecting tampering in a signal conditioner of electronics that determines a parameter from signals received from one or more sensors is provided. The system includes a host system that receives the parameter signals from the signal conditioner indicating properties of a material and supplies power to the signal conditioner. The signal conditioner is remote from and coupled to said host system. The signal conditioner generates the parameter signals. The host system is configured to periodically transmit a request for said authentication information to said signal conditioner, receive said authentication information from said signal conditioner in response to said request, compare said authentication information with initial authentication information, and detect said tampering condition in said signal conditioner if said authentication information is not equal to said initial authentication information.

21 Claims, 5 Drawing Sheets

SYSTEM FOR PREVENTING TAMPERING WITH A SIGNAL CONDITIONER REMOTE FROM A HOST SYSTEM

This application is a continuation of co-pending U.S. patent application Ser. No. 09/489,864, filed on Jan. 24, 2000, and entitled "System for Preventing Tampering with a Signal Conditioner Remote from a Host System," and claims a common filing date for material in common with this application. Furthermore, the parent application is incorporated by reference herein.

FIELD OF THE INVENTION

This invention relates to a signal processing system having a host system that provides power to and receives parameter signals from a signal conditioner that receives signals from sensors and generates the parameter signals. More particularly, this invention relates to a system that prevents tampering with the signal conditioner. Still more particularly, this invention relates to a tampering prevention system that is executed by the host system, which periodically receives and stores authentication information from the signal conditioner.

PROBLEM

It is common to buy and sell materials in measured quantities. For example, gas and oils are often sold in quantities of gallons or barrels. Therefore, it is critical that measurements of a material being delivered are accurate. In order to prevent fraud, government agencies require that devices measuring the amount of material being delivered are tamper proof. Some of these requirements are given in NIST Handbook 44 (1998 Edition) and OIML R 117 (1995 Edition).

One type of device used to measure material being delivered is a Coriolis Flowmeter. A Coriolis mass flowmeter measures mass flow and other information of materials flowing through a pipeline in the manner described by U.S. Pat. No. 4,491,025 issued to J. E. Smith, et al. of Jan. 1, 1985 and Re. 31,450 to J. E. Smith of Feb. 11, 1982. A Coriolis mass flowmeter has one or more flow tubes of a curved or straight configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a vibrational force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Sensors are placed at two different points on the flow tube to produce sinusoidal signals representative of the motion of the flow tube at the two points. A phase difference of the two signals received from the sensors is calculated in units of time. The phase difference between the two sensor signals is proportional to the mass flow rate of the material flowing through the flow tube or flow tubes.

The sensors transmit the sinusoidal signals to a signal conditioner. The signal conditioner generates parameter signals that indicate properties of the material flowing through the flowmeter. The signal conditioner also generates a drive signal applied to the driver to vibrate the flow tubes. The parameter signals are then transmitted to a host system, which provides the desired properties to a user.

In the past, manufacturers prevented tampering with the signal conditioner in the following manner. The signal conditioner has a security switch. The security switch prevents others from changing calibration information in the signal conditioner. Access to the security switch is prevented by placing the signal conditioner and host system in a housing, which is sealed. In order to seal the housing, holes are drilled into opposing sides of the housing. A wire is then threaded through the housing and a lead seal is then placed on the wire. This allows for easy visual inspection to determine if the electronics have been tampered with.

However, the use of a seal on the housing is a problem for use in a sanitary operation. In a sanitary operation, the entire housing must be easily cleanable. An example of sanitary operations is the delivery of ingredients in a cooking system. In sanitary operation, the holes and seal have crevices and grooves that are hard to clean.

An alternative method of preventing tampering with the signal conditioner is to maintain an audit trail of changes in the signal conditioner. This allows for easy detection of tampering from a readout of the audit. However, the audit trail method requires a large amount of non-volatile memory and a real time clock. This adds greatly to the expense of each signal conditioner. Therefore, this is not a satisfactory solution for providing a tamper proof system.

SUMMARY OF THE INVENTION

The above and other problems are solved and an advance in the art is made by a tamper proof signal conditioner in accordance with this invention. A first advantage of the tamper proof signal conditioner in accordance with this invention is that the signal conditioner may be used in a sanitary environment. A second advantage is that the signal conditioner does not require additional memory or a real time clock in order to provide a tamper proof system.

In accordance with this invention, the signal conditioner and the host system are physically separated. The signal conditioner is circuitry that receives signals from sensors and converts the signals to parameter signals that indicate properties of a material. The host system supplies powers to the signal conditioner and receives the parameter signal from the signal conditioner. A conventional 4-wire cable connects the host system and signal conditioner to allow the host system to provide power to the signal conditioner and to transfer data between one another.

The host system is a processing unit that executes applications which provide the tamper proof system in accordance with this invention. The signal conditioner stores calibration and configuration data as well as a unique identification. For purposes of this invention, the signal conditioner may or may not contain a processing unit. For purposes of this discussion, the identification, calibration and configuration data are termed authentication data.

The host system periodically transmits a request to the signal conditioner for the authentication data. In a preferred embodiment, the host system and signal conditioner communicate using a MODBUS™ protocol or HART™ protocol. The signal conditioner receives the request and reads the identification and calibration data. The identification and calibration data are then transmitted to the host system.

The host system stores the received information in a memory to provide an audit trail. The host system may also compare the received authentication information to initial information stored in the host system. If the authentication data does not match the initial information, the host system may generate an error signal. In response to the error signal, the host system may disable the system.

A system for detecting tampering in a signal conditioner of electronics that determines a parameter from signals received from one or more sensors is provided. The system comprises a host system that receives the parameter signals from the signal conditioner indicating properties of a material and supplies power to the signal conditioner. The signal conditioner is remote from and coupled to the host system. The signal conditioner generates the parameter signals. The host system is configured to periodically transmit a request for said authentication information to said signal conditioner, receive said authentication information from said signal conditioner in response to said request, compare said authentication information with initial authentication information, and detect said tampering condition in said signal conditioner if said authentication information is not equal to said initial authentication information.

A vibratory flowmeter configured to detecting tampering is provided. The vibratory flowmeter comprises a vibratory flow meter assembly configured to generate one or more sensor signals related to a material in the vibratory flow meter assembly, a host system that receives parameter signals from the signal conditioner indicating properties of a material in the vibratory flowmeter and supplies power to the signal conditioner, and the signal conditioner that is remote from and coupled to the host system and is coupled to the vibratory flow meter assembly. The signal conditioner receives the one or more sensor signals from the vibratory flow meter assembly and generates the parameter signals that indicate at least one property of the material. The host system is configured to periodically transmit a request for said authentication information to said signal conditioner, receive said authentication information from said signal conditioner in response to said request, compare said authentication information with initial authentication information, and detect said tampering condition in said signal conditioner if said authentication information is not equal to said initial authentication information.

A method for detecting tampering in a signal conditioner of a system is provided. The method comprises periodically transmitting a request for authentication information from a host system to said signal conditioner, with the authentication information including calibration and configuration information of the signal conditioner, receiving said authentication information from said signal conditioner in response to said request, comparing said authentication information with initial information, and signaling a tampering condition in the signal conditioner in response to said authentication information not being equal to said initial information.

DESCRIPTION OF THE DRAWINGS

The above and other advantages of this invention are described in the Detailed Description and the following drawings.

DETAILED DESCRIPTION

Figure 1:
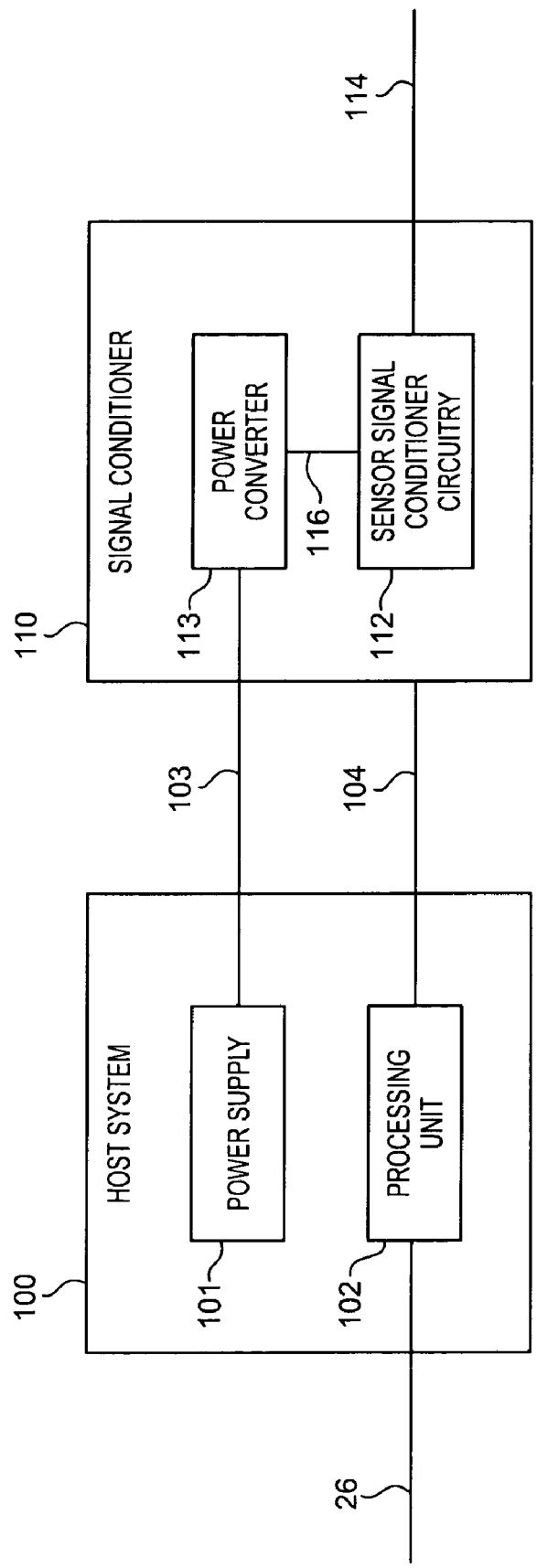
FIG. 1 illustrating a block diagram of a host system and a signal conditioner.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

This invention relates to a system for preventing tampering with a signal conditioner. For purposes of this discussion, a signal conditioner is circuitry that receives signals from sensors and processes the signals to determine a system parameter. An example of a system parameter is a property of a material that the sensors are detecting. Those skilled in the art will recognize that the sensors may be attached to any type of device and that type of device is irrelevant to this invention.

In this system, the signal conditioner is enclosed in a housing that can be used in sanitary environments. This means the housing is easily cleaned. The signal conditioner is connected to a host system that is remote from the signal conditioner and in a separate housing. A host system and signal conditioner in accordance with this invention are shown below.

FIG. 1 illustrates a block diagram of a host system 100 and a signal conditioner 110 that incorporate the tamper proof system of this invention. Host system 100 includes a power supply 101 and a processing unit 102. Power supply 101 supplies the power needed to processing unit 102. Power supply 101 also supplies power to signal conditioner 110 via path 103. Processing unit 102 receives parameter signals from signal conditioner 110 and provides a parameter to user via path 26 and a secondary device. Processing unit 102 communicates with signal conditioner 110 via path 104 to receive the parameter signals and execute applications in accordance with this invention. In order to communicate, processing unit 102 and signal conditioner 110 may use any known protocol. Two exemplary protocols are HART™ and MODBUS™.

Signal conditioner 110 includes a sensor signal conditioner circuitry 112 and power converter 113. Sensor signal conditioner circuitry 112 receives sensor signals from sensors via path 114. The sensor signals are then converted by signal conditioner circuitry 112 into parameter signals. The parameter signals indicate a parameter of the system being measured by the sensors. One skilled in the art will recognize that sensor signal conditioner circuitry 112 may include a processing unit, such as a digital signal processor and the necessary circuitry needed to convert the sensor signals into digital signals that are readable by the processing unit. The parameter signals are then transmitted from signal conditioner circuitry 112 to host system 100 via path 104.

Power converter 113 receives power from host system 100. The power may then be converted and applied to the system being measured by the sensors or applied to the sensors.

Power converter 113 also provides power to sensor signal conditioner circuitry 112 via path 116.

Figure 2:
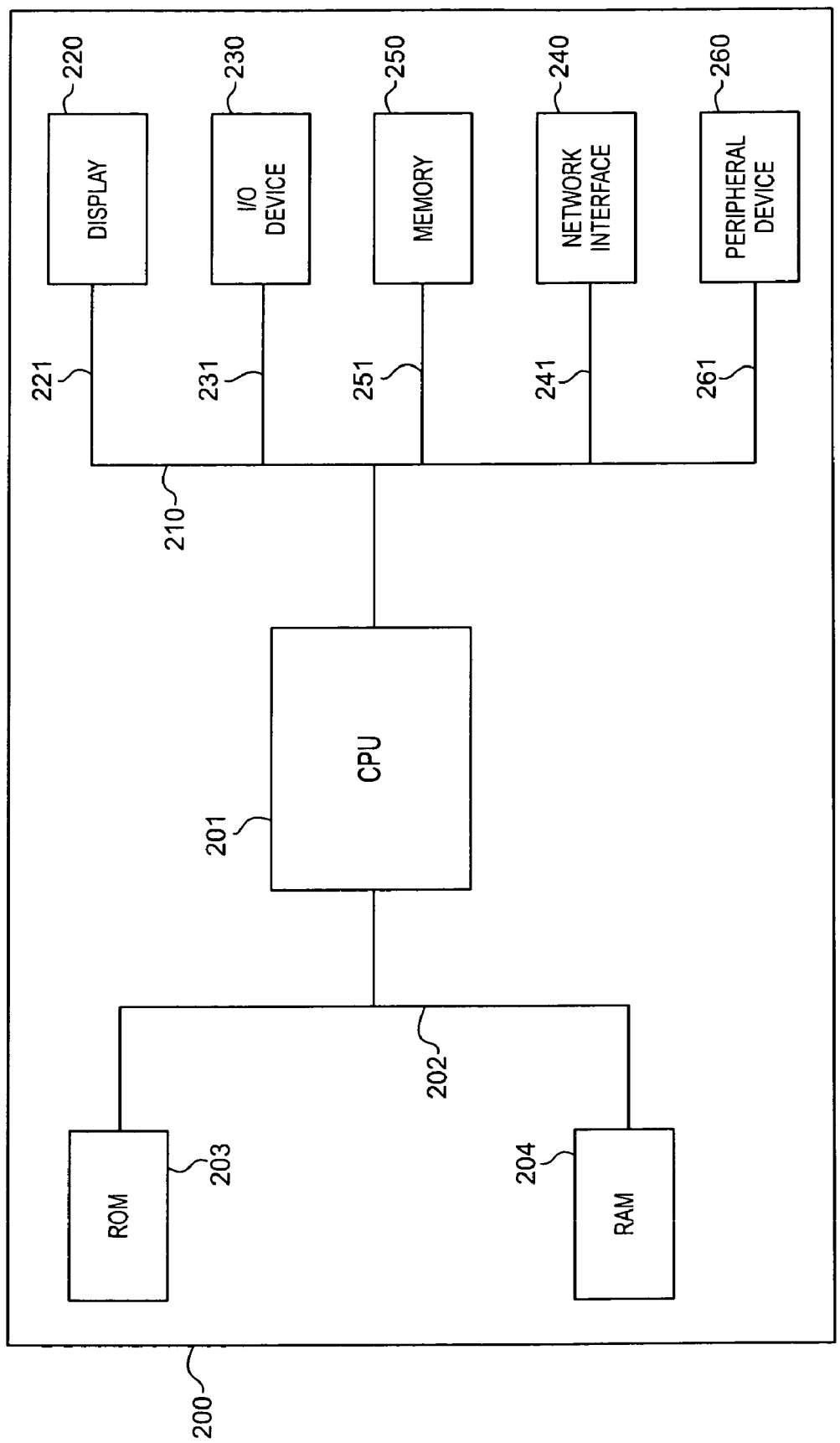
FIG. 2 illustrates an exemplary secondary processing system in a host system.

FIG. 2 illustrates an exemplary processing unit 200 which may be used as processing unit 102 in host system 100 or as a digital signal processor in signal conditioner 110 of FIG. 1. Processing system 200 has a central processing unit (CPU) 201 which executes instructions read from a memory to perform applications that comprise the operations of processing system 200. One skilled in the art will recognize that CPU 201 may be a microprocessor, processor, or any combination grouping multiple processors and microprocessors. CPU 201 is connected to a memory bus 202. Memory bus 202 allows CPU 201 to access Read Only Memory (ROM) 203 and Random Access Memory 204. ROM 203 is a memory that stores instructions for performing the basic operative tasks of processing system 200. RAM 204 is a memory that stores the instructions and data needed to execute applications that are performed by processing system 200.

I/O bus 210 connects CPU 201 to a plurality of peripheral devices. CPU 201 receives and transmits data to the peripheral devices via I/O bus 210. The peripheral devices connected to I/O bus 210 include, but are not limited to, display 220, I/O device 230, network interface 240, and non-volatile memory 250. Display 220 is connected to I/O bus 210 by path 221 and includes a video driver and connected monitor for displaying information to a user. I/O device 230 is connected to I/O bus 210 via path 231 and is a keyboard and/or mouse attached to an appropriate driver for receiving input data from a user. Network interface 240 is connected to I/O bus 210 via path 241 and may by a modem, Ethernet device driver, or other type of communications interface that allows processing system 200 to communicate with another device, such as a second processing system. Non-volatile memory 250 is a device, such as a disk drive, connected to I/O bus 210 via path 251 and which can read and write data to a disk or other storage media to store the data for future use. Peripheral device 260 is any other device that may be connected to I/O bus 210 via path 261 to share data with CPU 201.

Figure 3:
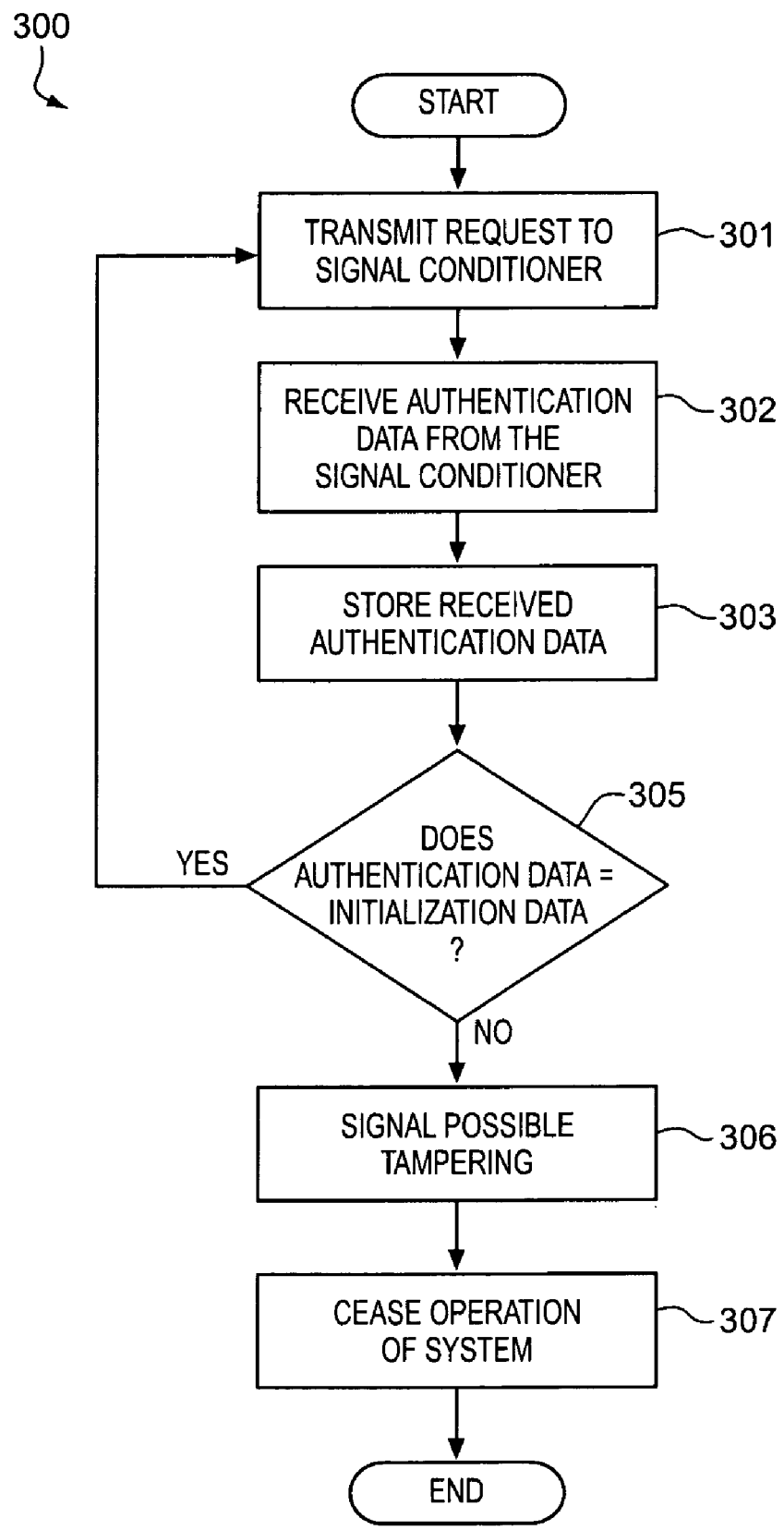
FIG. 3 illustrates a process executed by the host system in accordance with this invention.

FIG. 3 illustrates a process executed by processing unit 102 of host system 100 to provide a tamper proof system in accordance with the present invention. A tamper proof system in accordance with this invention stores a record of authentication data transmitted to the host system 100 from the signal conditioner 110 to ensure that someone does not tamper with signal conditioner 110. The authentication information comprises information that can change, but is not authorized to be changed except by a signal conditioner manufacturer or agents thereof. The authentication information is checked periodically to insure against tampering. Periodically means that the process may be executed at a set time interval, after a batch of a predetermined number of measurements are taken, or at random time intervals. The setting of the period is left to those skilled in the art.

Process 300 begins in step 301 with processing unit 102 in host system 100 transmitting a request for authentication information to signal conditioner 110. The authentication information may be a unique identification, calibration data, or other forms of data that does not change over time. It should be noted that combinations of these types of data may be used as well. Signal conditioner 110 receives the request and performs a process such as the one described below to transmit message containing authentication data back to processing unit 102 of host system 100.

In step 302, processing unit 102 receives the authentication information from the signal conditioner 110. A record of the received authentication information is then generated and stored in a memory in step 303. This provides an audit trail showing that there is no change in the signal conditioner 110.

After a record is stored, the received authentication information may be compared to initial information for the signal conditioner stored in the host system in step 304. This initial information may be received from the signal conditioner 110 at the time the system begins operation. Alternatively the initial information may be stored in a read only memory prior to operation to assure that the host system only operate with one pre-identified signal conditioner 110.

If the initial information matches the received authentication information then process 300 ends and waits to execute after the next period elapses. If the initial information does not match the received authentication information, the processing unit 102 may generate a signal indicating possible tampering or other type of error in step 306. The processing unit 102 may then cease operation of the system in step 307. The ceasing of operation prevents any potentially false reading from being used. Process 300 then ends.

Figure 4:
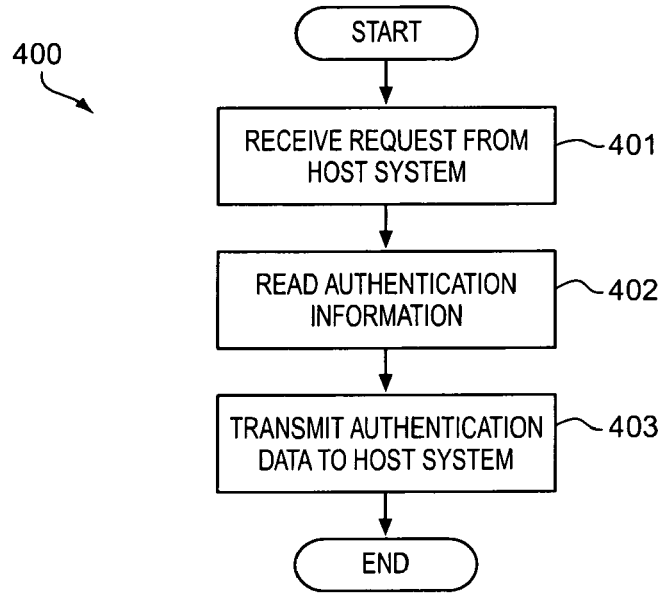
FIG. 4 illustrating a process executed by the signal conditioner in accordance with this invention.

FIG. 4 illustrates an exemplary process 400 executed by a signal conditioner in response to receiving a request for authentication information. Process 400 begins in step 401 in which signal conditioner 110 receives the request from the host system. In response to receiving the request, signal conditioner 110 reads the authentication information from a memory. Preferably, the memory is a Read Only Memory to prevent tampering. Alternatively, if signal conditioner 110 contains a processing unit, signal conditioner 110 may generate the authentication information using a predetermined process executed by the processing unit that will generate an expected result. After the authentication information is retrieved, signal conditioner 110 generates a message including the authentication information and transmits the information to host system 100 in step 403 and process 400 ends.

Figure 5:
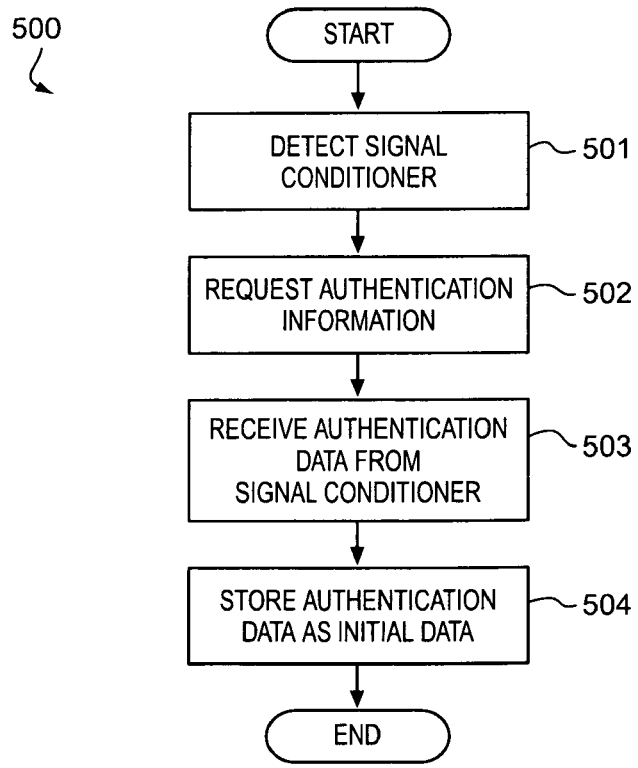
FIG. 5 illustrating a process executed by the host system to initialize the system in accordance with this invention.

Process 500 illustrated in FIG. 5 is an exemplary process executed by processing unit 102 in host system 102 to retrieve initial information to executed the processes in accordance with this invention. Process 500 begins in step 501 with processing unit 102 in host system 100 detecting a signal conditioner 110 connected to host system 100. Processing unit 102 transmits a request for authentication information to the signal conditioner 110 in step 502.

The signal conditioner receives the request and transmits authentication information for the signal conditioner 110 to host system 100. Processing unit 102 of host system 100 receives the authentication information in step 503. The authentication is then stored as initial information in step 504 and process 500 ends.

Figure 6:
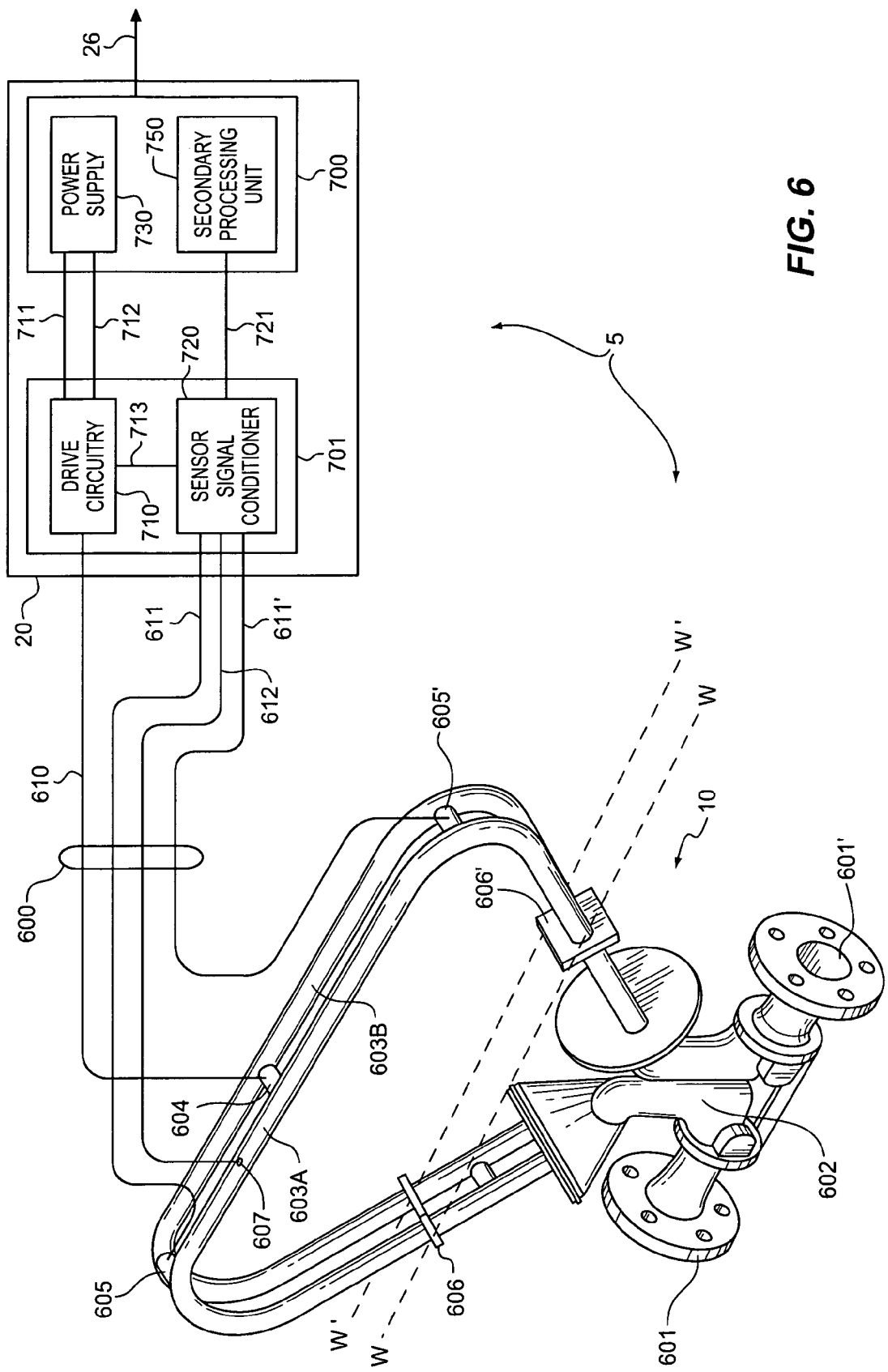
FIG. 6 illustrating a preferred embodiment of this invention in a Coriolis flowmeter.

FIG. 6 illustrates one type of system that may use the tamper proof system in accordance with this invention. One skilled in the art will recognize the process in accordance with this invention may be applied to other types of systems to provide a tampering prevention system. FIG. 6 shows an exemplary Coriolis flowmeter 5 comprising a Coriolis flowmeter assembly 10 and meter electronics 20. Meter electronics 20 is connected to flowmeter assembly 10 via path 600 to provide density, mass flow rate, volume flow rate and totalized mass flow information over path 26. A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 10 includes a pair of flanges 601 and 601', manifold 602 and conduits 603A and 603B. Connected to conduits 603A and 603B are driver 604, pick-off sensors 605 and 605', and temperature sensor 607. Brace bars 606 and 606' serve to define the axis W and W' about which each conduit oscillates.

When Coriolis flowmeter 5 is inserted into a pipeline system (not shown) which carries the process material that is being measured, material enters flowmeter assembly 10 through flange 601, passes through manifold 602 where the material is directed to enter conduits 603A and 603B, flows through conduits 603A and 603B and back into manifold 602 from where it exits meter assembly 10 through flange 601'.

Conduits 603A and 603B are selected and appropriately mounted to the manifold 602 so as to have substantially the same mass distribution, moments of inertia and elastic modules about bending axes W-W and W'-W', respectively. The conduits 603A-603B extend outwardly from the manifold in an essentially parallel fashion.

Conduits 603A-603B are driven by driver 604 in opposite directions about their respective bending axes W and W' and at what is termed the first out of phase bending mode of the flowmeter. Driver 604 may comprise any one of many well known arrangements, such as a magnet mounted to conduit 603A and an opposing coil mounted to conduit 603B and through which an alternating current is passed for vibrating both conduits. A suitable drive signal is applied by meter electronics 20 to driver 604 via path 610.

Pick-off sensors 605 and 605' are affixed to at least one of conduits 603A and 603B on opposing ends of the conduit to measure oscillation of the conduits. As the conduit 603A-603B vibrates, pick-off sensors 605-605' generate a first pick-off signal and a second pick-off signal. The first and second pick-off signals are applied to paths 611 and 611' prime. The driver velocity signal is applied to path 610.

Temperature sensor 607 is affixed to at least one conduit 603A and/or 603B. Temperature sensor 607 measures the temperature of the conduit in order to modify equations for the temperature of the system. Path 612 carries temperature signals from temperature sensor 107 to meter electronics 20.

Meter electronics 20 receives the first and second pick-off signals appearing on paths 611 and 611', respectively. Meter electronics 20 processes the first and second velocity signals to compute the mass flow rate, the density, or other property of the material passing through flowmeter assembly 10. This computed information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

In this invention, the meter electronics 20 are physically divided into 2 components a host system 700 and a signal conditioner 701. In conventional meter electronics, these components are housed in one unit.

Signal conditioner 701 includes drive circuitry 710 and pick-off conditioning circuitry 720. One skilled in the art will recognize that in actuality drive circuitry 710 and pick-off conditioning circuitry 720 may be separate analog circuits or may be separate functions provided by a digital signal processor or other digital components. Drive circuitry 710 generates a drive signal and applies the drive signal to driver 604 via path 710 of path 600. In actuality, path 110 is a first and a second lead. Drive circuitry 710 is communicatively connected to pick-off signal conditioning circuitry 720 via path 713. Path 713 allows drive circuitry to monitor the incoming pick-off signals to adjust the drive signal. Power to operate drive circuitry 710 and pick-off signal conditioning circuitry 720 is supplied from host system 700 via a first wire 711 and a second wire 712. First wire 711 and second wire 712 may be a part of a conventional 2-wire, 4-wire cable, or a portion of a multi-pair cable.

Pick-off signal conditioning circuitry 720 receives input signals from first pick-off 605, second pick-off 605', and temperature sensor 607 via paths 611, 611' and 612. Pick-off circuitry 720 determines the frequency of the pick-off signals and may also determine properties of a material flowing through conduits 603A-603B. After the frequency of the input signals from pick-off sensors 605-605' and properties of the material are determined, parameter signals carrying this information are generated and transmitted to a secondary processing unit 750 in host system 700 via path 721. In a preferred embodiment, path 721 includes two leads. However, one skilled in the art will recognize that path 721 may be carried over first wire 711 and second wire 712 or over any other number of wires.

Host system 700 includes a power supply 730 and processing system 750. Power supply 730 receives electricity from a source and converts the received electricity to the proper power needed by the system. Processing system 750 receives the parameter signals from pick-off signal conditioning circuitry 720 and then may perform processes needed to provide properties of the material flowing through conduits 603A-603B needed by a user. Such properties may include but are not limited to density, mass flow rate, and volumetric flow rate. Processing system 750 performs the processes shown in FIGS. 3 and 5 to provide a tamper prevention system in accordance with the present invention.

The above description provides an exemplary embodiment of the tampering prevention system in accordance with this invention. It is expected that those skilled in the art can and will design alternative embodiments that infringe on this invention as set forth in the claims below either literally or through the Doctrine of Equivalents.

What is claimed is:

1. A system for detecting tampering in a signal conditioner of electronics that determines a parameter from signals received from one or more sensors, said system comprising:
  a host system that receives said parameter signals from said signal conditioner indicating properties of a material and supplies power to said signal conditioner; and
  said signal conditioner is remote from and coupled to said host system, wherein said signal conditioner generates said parameter signals;
  with said host system being configured to transmit an initialize request to said signal conditioner, requesting said authentication information in response to detecting said signal conditioner being connected to said host system, receive said authentication information from said signal conditioner, and store said authentication information as said initial authentication information;
  with said host system being configured to periodically transmit a request for authentication information to said signal conditioner, receive said authentication information from said signal conditioner in response to said request, compare said authentication information with initial authentication information, and detect said tampering condition in said signal conditioner if said authentication information is not equal to said initial authentication information, with the authentication information comprising information that can change but is not authorized to be changed except by a signal conditioner manufacturer or agents thereof.

2. The system of claim 1 wherein the authentication information further includes identification information.

3. The system of claim 1 wherein said host system stores a record of said authentication information received from the signal conditioner.

4. The system of claim 1 wherein said host system stores a record of said authentication information received from the signal conditioner, with said record including a time stamp indicating when said authentication information is received.

5. The system of claim 1 wherein said host system is further configured to terminate operation if tampering is detected.

6. The system of claim 1 wherein said host system is further configured to perform a predetermined programmed function if tampering is detected.

7. A vibratory flowmeter configured to detect tampering, the vibratory flowmeter comprising:
 a vibratory flow meter assembly configured to generate one or more sensor signals related to a material in said vibratory flow meter assembly;
 a host system that receives parameter signals from a signal conditioner indicating properties of a material in said vibratory flowmeter and supplies power to said signal conditioner; and
 said signal conditioner is remote from and coupled to said host system and is coupled to said vibratory flow meter assembly, wherein said signal conditioner receives said one or more sensor signals from said vibratory flow meter assembly and generates said parameter signals that indicate at least one property of said material;
 with said host system being configured to transmit an initialize request to said signal conditioner, requesting said authentication information in response to detecting said signal conditioner being connected to said host system, receive said authentication information from said signal conditioner, and store said authentication information as said initial authentication information;
 with the host system being configured to periodically transmit a request for authentication information to said signal conditioner, receive said authentication information from said signal conditioner in response to said request, compare said authentication information with initial authentication information, and detect said tampering condition in said signal conditioner if said authentication information is not equal to said initial authentication information, with the authentication information comprising information that can change but is not authorized to be changed except by a signal conditioner manufacturer or agents thereof.

8. The vibratory flowmeter of claim 7 with the vibratory flowmeter further comprising a Coriolis flowmeter.

9. The vibratory flowmeter of claim 7 with the vibratory flowmeter further comprising a vibratory densitometer.

10. The vibratory flowmeter of claim 7 with the vibratory flow meter assembly comprising:
 at least one flow conduit configured to measure properties of a material therein;
 a driver configured to vibrate said at least one flow conduit;
 one or more pick-off sensors coupled to said at least one flow conduit and configured to generate said one or more sensor signals indicating vibrations of said at least one flow conduit; and
 said signal conditioner coupled to said one or more pick-off sensors and configured to receive said sensor signals and generate said parameter signals.

11. The vibratory flowmeter of claim 7 wherein the authentication information further includes identification information.

12. The vibratory flowmeter of claim 7 wherein said host system stores a record of said authentication information received from the signal conditioner.

13. The vibratory flowmeter of claim 7 wherein said host system stores a record of said authentication information received from the signal conditioner, with said record including a time stamp indicating when said authentication information is received.

14. The vibratory flowmeter of claim 7 wherein said host system is further configured to terminate operation if tampering is detected.

15. The vibratory flowmeter of claim 7 wherein said host system is further configured to perform a predetermined programmed function if tampering is detected.

16. A method for detecting tampering in a signal conditioner of a system, comprising:
 transmitting an initialize request from a host system to said signal conditioner, requesting said authentication information in response to detecting said signal conditioner being connected to said host system;
 receiving said authentication information from said signal conditioner and storing said authentication information in said host system as said initial authentication information;
 periodically transmitting a request for authentication information from the host system to said signal conditioner, with the authentication information including calibration and configuration information of the signal conditioner and with the authentication information comprising information that can change but is not authorized to be changed except by a signal conditioner manufacturer or agents thereof;
 receiving said authentication information from said signal conditioner in response to said request;
 comparing said authentication information with initial information; and
 signaling a tampering condition in the signal conditioner in response to said authentication information not being equal to said initial information.

17. The method of claim 16 wherein the authentication information further includes identification information.

18. The method of claim 16 wherein said host system stores a record of said authentication information received from the signal conditioner.

19. The method of claim 16 wherein said host system stores a record of said authentication information received from the signal conditioner, with said record including a time stamp indicating when said authentication information is received.

20. The method of claim 16 wherein said host system is further configured to terminate operation if tampering is detected.

21. The method of claim 16 wherein said host system is further configured to perform a predetermined programmed function if tampering is detected.

* * * * *